United States Patent
Oulai et al.

(10) Patent No.: US 7,835,377 B2
(45) Date of Patent: Nov. 16, 2010

(54) SESSION CONTINUITY FOR SUPPORT OF SIMULTANEOUS TERMINAL ACCESSES

(75) Inventors: Desire Oulai, Longueuil (CA); Suresh Krishnan, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 48 days.

(21) Appl. No.: 12/269,554

(22) Filed: Nov. 12, 2008

(65) Prior Publication Data

US 2010/0118879 A1    May 13, 2010

(51) Int. Cl.
*H04J 3/22* (2006.01)
(52) U.S. Cl. ..................... 370/401; 370/469
(58) Field of Classification Search ........ 370/401, 370/469
See application file for complete search history.

(56) References Cited

U.S. PATENT DOCUMENTS

| | | | |
|---|---|---|---|
| 2003/0026241 A1* | 2/2003 | Ono et al. | 370/349 |
| 2004/0004956 A1* | 1/2004 | Gilmour et al. | 370/352 |
| 2006/0039407 A1 | 2/2006 | Grech et al. | |
| 2007/0189250 A1* | 8/2007 | Haddad et al. | 370/338 |
| 2007/0254661 A1* | 11/2007 | Chowdhury et al. | 455/436 |
| 2008/0317064 A1* | 12/2008 | Choi et al. | 370/466 |
| 2009/0245149 A1* | 10/2009 | Xia et al. | 370/310 |
| 2010/0040021 A1* | 2/2010 | Aso et al. | 370/331 |
| 2010/0091653 A1* | 4/2010 | Koodli et al. | 370/235 |

OTHER PUBLICATIONS

H. Soliman et al., Flow Bindings in Mobile IPv6 and Nemo Basic Support, Internet Draft, IETF MEXT Working Group, May 16, 2008.
D. Premec et al., Inter-technology handover in netlmm domain, Internet Draft, NETLMM Working Group, Apr. 26, 2008.
S. Gundavelli et al., Proxy Mobile IPv6, RFC 5213, Aug. 2008.
S. Deering et al., Internet Protocol, Version 6 (IPv6) Specification, RFC 2460, Dec. 1998.
Dutta, A.., et al., "ProxyMIP Extension for Inter-MAG Route Optimization", NETLMM Working Group, Internet-Draft, Feb. 18, 2008, pp. 1-28.
Gundavelli, S., et al., "Proxy Mobile IPv6", NETLMM WG, Internet-Draft, Mar. 5, 2007, pp. 1-52.
PCT Search Report from corresponding application PCT/IB2009/054836.

* cited by examiner

*Primary Examiner*—Daniel J Ryman
*Assistant Examiner*—Jay P Patel
(74) *Attorney, Agent, or Firm*—Benoit Yelle; Ericsson Canada, Inc.

(57) ABSTRACT

Methods and nodes are provided for supporting session continuity for terminals capable of having simultaneous accesses while served by a plurality of gateways. Distinct binding cache entries (BCE) are stored for a terminal, each BCE being related to one of the gateways serving the terminal. The BCEs identify the terminal, provide an address allocated thereto for getting access at a gateway, and identify the gateway providing the access. When detection is made that two of more BCEs relate to the same terminal for distinct gateways, address information is sent to each other gateway.

18 Claims, 4 Drawing Sheets

SESSION CONTINUITY FOR SUPPORT OF SIMULTANEOUS TERMINAL ACCESSES

TECHNICAL FIELD

The present invention relates generally to the field of communications and, more specifically, to methods and nodes for supporting session continuity during simultaneous accesses by a terminal.

BACKGROUND

Proxy Mobile IP (PMIP) is a protocol that provides access and mobility capabilities to a terminal without the need for the terminal to support specific mobility related signaling. Mobility features are solely supported by a PMIP network. PMIP defines for the terminal a proxy care-of address (pCoA) that is sent by PMIP nodes towards an agent that owns a subscription for the terminal. The pCoA is the address of a gateway that provides connectivity to the terminal. A description of PMIP is made in RFC 5213, entitled "Proxy Mobile IPv6", from the Internet Engineering Task Force (IETF).

The PMIP network comprises a local mobility anchor (LMA), sometimes called local mobility agent, and one or more media access gateways (MAG), which are also sometimes referred to as proxy mobile agents. The LMA and MAGs provide PMIP support to terminals. A terminal that is currently located within the PMIP network is provided access by one of the MAGs.

When a given terminal attaches to a domain that supports PMIP, it sends an access request, which arrives at a MAG, either directly or through an access point. The MAG sends information about the access request to the LMA in a Proxy Binding Update (PBU) message. The access request may also be forwarded from the MAG to an authentication server for authentication and profile retrieval. The PBU comprises an address of the MAG, called proxy care-of address (pCoA), to be used as a care-of address of the terminal. The LMA stores in a binding cache the pCoA with a home network prefix (HNP) of the terminal. This HNP, which is a form of subnet prefix, may be assigned to the terminal by the LMA. Sometimes, the LMA may obtain the HNP from a dynamic host control protocol (DHCP) server. The LMA replies to the MAG with a proxy binding acknowledgement (PBA) message carrying the HNP of the terminal. Having received the PBA, the MAG advertises the HNP on a link to the terminal. This makes the terminal act as if it was connected on a home link. The terminal configures for itself a home address (HoA) based on the HNP and on an interface identifier (IID) for an interface used to connect the terminal to the MAG. The IID may be supplied to the terminal by the LMA and sent via the MAG in the PBA message. The IID may alternatively be generated by the MAG itself. Whether the IID originates from the LMA or from the MAG, the MAG may advertise it along with advertising of the HNP. In other cases, the terminal may select its own IID. Any data traffic initiated at an external correspondent, intended to be sent to the terminal, is addressed to the HoA of the terminal. As the LMA is the entity that advertises the HNP beyond the PMIP network, it intercepts a packet of the data traffic and encapsulates and tunnels it to the MAG by use of the pCoA. The MAG receives this packet, decapsulates it, and sends it to the terminal. Packets originating from the terminal are sent through the MAG to the LMA and then to their destination addresses.

The operator of a PMIP network may at once support several access technologies. Because a specific MAG may be associated with an access point dedicated to one specific access technology, the operator may install, in close proximity of each other, a plurality of MAGs, each of which has distinct characteristics.

Today's terminals may support multiple concurrent functions and may comprise multiple access ports using multiple access channels, sometimes using distinct access technologies, for supporting these concurrent functions. A given terminal may, for example, use a wireless local area network (WLAN) radio access technology to connect through a first MAG towards a first correspondent node. The same terminal may at the same time use a cellular radio access technology, such as for example high speed packet access (HSPA), to connect with a second correspondent node through a second MAG. The terminal may further connect, for example, via the first MAG, towards the first and a third correspondent node. In such a case, the terminal will have two data flows established through the same first MAG for communicating with the first and third correspondent nodes. For the two data flows established through the first MAG, the LMA may allocate two distinct HNPs for the terminal, which leads to the assignment of two distinct HoAs to the terminal. Alternatively, a single HoA may be used to support more than one data flow, inasmuch as flow identities, inserted in each packet of each data flow, are used to distinguish the data flows.

When the terminal is concurrently connected through two MAGs, the terminal concurrently operates under two distinct HoAs. Two HoAs are used because the LMA has allocated distinct HNPs for use on these two MAGs and further because each of these connections is made through a distinct interface of the terminal, each interface having assigned thereto its own IID. In communicating with the correspondent nodes, the terminal uses these two distinct HoAs which are used as destination addresses by the correspondent nodes for sending packets towards the terminal. Of course, if the terminal is connected towards two correspondent nodes via the first MAG and towards another correspondent node via the second MAG, the two data flows that travel via the first MAG may still share the same HoA if the first MAG has not configured two distinct HoAs on the same link.

Current wireless access technologies allow moving a terminal between access points. One example of this may be when the terminal is located within the coverage of a WLAN network. Because such a network generally has limited geographical coverage, as a user of the terminal moves away from that coverage, it may be required to disconnect the terminal from a MAG associated with the WLAN network and to reconnect the terminal to another MAG associated with a cellular coverage.

Quality of a connection might provide reasons for moving a data flow from a first MAG to a second MAG. The terminal may for example detect that an available bandwidth on the first MAG is not sufficient for adequately supporting a service; this may happen for example on a WLAN connection used in a high traffic area. The terminal may elect to move a connection to the second MAG if that MAG provides a higher bandwidth, for example by use of HSPA. Other considerations for moving the data flow could be based on experienced or expected delays, or various quality of service (QoS) aspects. Of course, such decisions to move a connection could also be taken in a policy decision function within the PMIP network, for example for purposes of balancing a load between MAGs. When the terminal is connected towards two correspondent nodes through a same MAG, a decision of moving a connection from a first MAG to a second MAG because of QoS, load balancing, bandwidth or delay considerations may be applicable to a data flow linking the terminal to one of those correspondent nodes and not to another data flow linking the terminal to the other correspondent node. This may be the case, for example, when a higher QoS offered on the second MAG is available at a higher tariff for the user of the terminal.

Generally, from the standpoint of a given correspondent node, the HoA of the terminal, which is used as a source or destination address for communicating with the correspondent node, defines a session therebetween. If the HoA changes, for example because an interface has changed, the correspondent node understands that there has been a connectivity loss and that the session must be terminated. The correspondent node may initiate setting up a new session or it may simply abandon the session, expecting that the terminal will initiate a new session.

SUMMARY

The present invention provides methods and nodes for supporting session continuity for a terminal while being served by multiple gateways.

A first embodiment of the present invention is directed to a method of supporting session continuity for a terminal served by a first gateway and a second gateway. The method comprises storing a first binding cache entry (BCE). The first BCE comprises a first terminal identity, a first subnet prefix and a first gateway identity. The method also stores a second BCE, which comprises a second terminal identity, a second subnet prefix and a second gateway identity. Detection is made that the first and second terminal identities are for a same terminal. Responsive to this detection, the second subnet prefix is sent to the first gateway and the first subnet prefix is sent to the second gateway.

A second embodiment of the present invention is directed to a method of supporting session continuity for a terminal connected on a first interface towards a first gateway and on a second interface towards a second gateway. The method comprises sending to an anchor binding update (BU) information comprising an address of the first gateway and an identity of the terminal. A first subnet prefix for use in communicating with the terminal on the first interface is received from the anchor, and the first subnet prefix is stored. A second subnet prefix for use in communicating with the terminal on the second interface is also receiving from the anchor and stored in relation with the first subnet prefix.

A third embodiment of the present invention is directed to an anchor node for supporting session continuity for a terminal served by a first gateway and a second gateway. The anchor node comprises an input/output (I/O) port, configured to communicate with the first and second gateways, and a controller. The controller controls the I/O port. The controller can also store in a memory a first BCE comprising a first terminal identity, a first subnet prefix and a first gateway identity. The controller can further store in the memory a second BCE comprising a second terminal identity, a second subnet prefix and a second gateway identity. The controller is capable of detecting that the first and second terminal identities are for a same terminal. Upon detecting, the controller is further configured to request the I/O port to send the second subnet prefix towards the first gateway and to send the first subnet prefix towards the second gateway.

A fourth embodiment of the present invention is directed to a gateway for supporting session continuity for a terminal connected on a first interface towards the gateway and on a second interface towards a peer gateway. The gateway comprises an I/O port, configured to communicate with an anchor, and a controller. The controller controls the I/O port. The controller is also configured to request the I/O port to send towards the anchor BU information comprising an address of the gateway and an identity of the terminal. The controller can receive from the anchor a first subnet prefix for use in communicating with the terminal on the first interface, and store the first subnet prefix in a memory. The controller can further receive from the anchor a second subnet prefix for use in communicating with the terminal on the second interface and store in the memory the second subnet prefix in relation with the first subnet prefix.

BRIEF DESCRIPTION OF THE DRAWINGS

For a more detailed understanding of embodiments of the present invention, reference can now be made to the following description, taken in conjunction with the accompanying drawings, in which.

DETAILED DESCRIPTION

Figure 1:
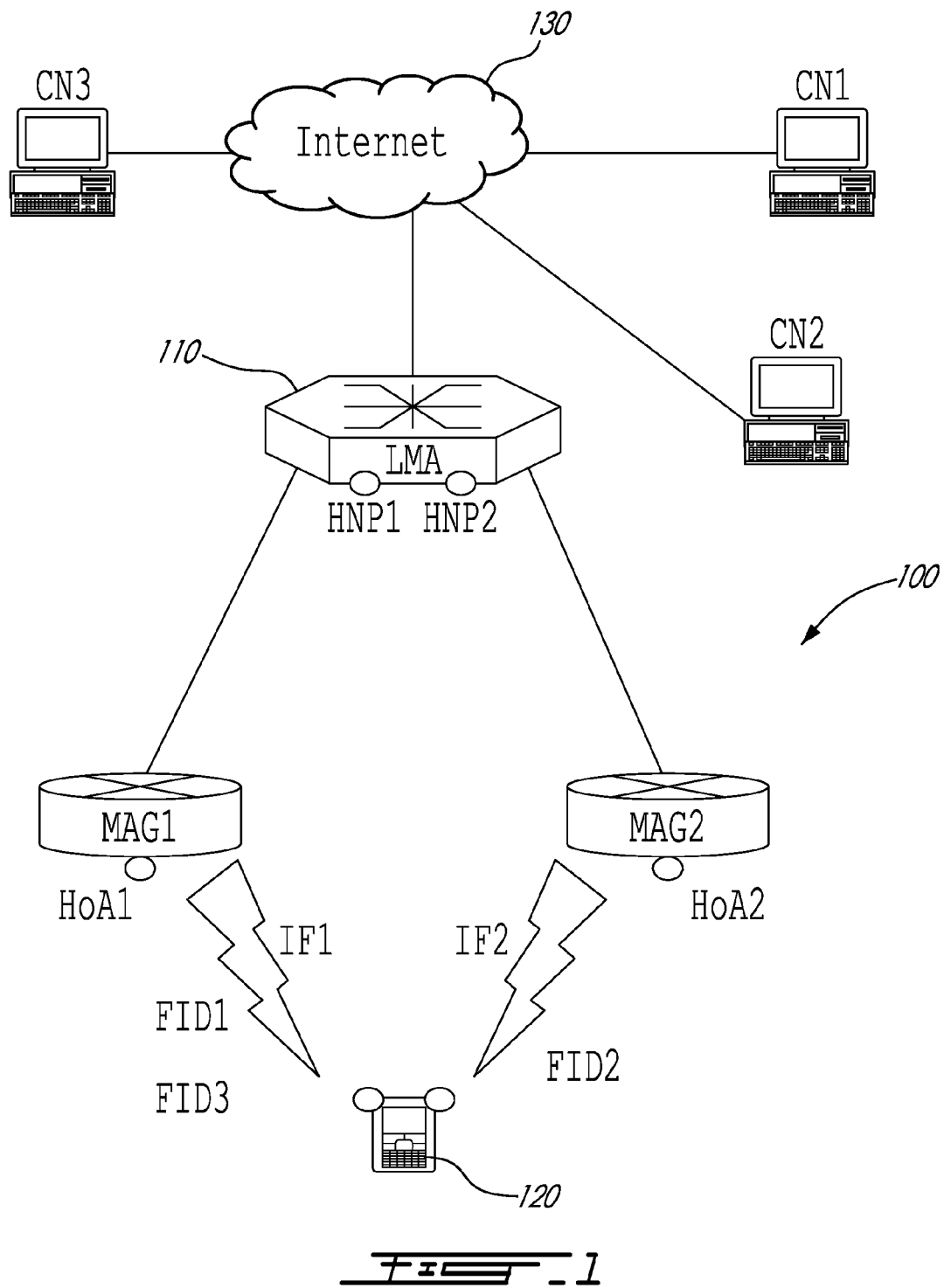
FIG. 1 is a representation of a proxy mobile internet protocol network.

The innovative teachings of the present invention will be described with particular reference to various exemplary uses and aspects of several exemplary embodiments. However, it should be understood that these embodiments provide only a few examples of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the embodiments of the present invention.

Embodiments of the present invention provide exemplary methods, anchor nodes and gateways for supporting continuity of a session served by a first gateway and by a second gateway. A data flow may be moved from a first interface of the first gateway to a second interface of the second gateway while maintaining session continuity for the data flow.

Exemplary embodiments of the invention allow a terminal located in a PMIP (Proxy Mobile IP) network comprising a local mobility anchor (LMA) and at least two mobile access gateways (MAG), when the terminal has concurrent accesses with two MAGs, to transfer a session, or a data flow from the session, from a first MAG to the second MAG without breaking the session.

Binding caches in the LMA, which relate a session of the terminal with one MAG, are complemented with information linking to another session supported by the other MAG. The LMA informs both MAGs of each other's session information. When the terminal transfers a session or a data flow therefrom, from a first MAG to a second MAG, the second MAG uses the information about the first MAG, previously received from the LMA, to accept that session. It forwards any packet related to that session, or data flow, received from the terminal, to the LMA. In turn, the LMA creates redirection information so that any incoming packet for the session, or data flow, can now be directed towards the terminal through the second MAG. In order to allow for the possibility to transfer a single data flow within a session, flow indicators may be added to the binding caches stored in the LMA.

In the context of the present invention, a terminal may comprise a mobile cellular telephone, a mobile node, a digital personal assistant, a laptop computer, an IP television apparatus, a gaming device, a server, and the like. Any terminal or server capable of communicating with the terminal may form a correspondent node. While exemplary embodiments of the invention are illustrated using PMIP nodes, those skilled in the art will appreciate that the present invention may be employed in any network comprising a node acting as an anchor or concentrator, along with two or more nodes that provide access to a terminal. Data is exchanged between network elements in the form of packets, also called data packets, and a suite of data packets exchanged between network elements form a flow, or data flow. Terms such as data, packet, flow, or combinations of these terms may thus be used interchangeably herein, when appropriate.

Reference is now made to the Drawings, in which FIG. 1 is a representation of a proxy mobile internet protocol network. The PMIP network 100 comprises a LMA 110 and two MAGs labeled MAG1 and MAG2. The PMIP network 100 allows communication between a terminal 120 and three correspondent nodes CN1, CN2 and CN3, generally through the Internet 130. The terminal 120 of the exemplary PMIP network 100 connects through MAG1 via an interface IF1, which may for example be a wireless local area network (WLAN) interface, and through MAG2 via an interface IF2, which may for example be a high speed packet access interface (HSPA) interface. Of course, other types of interfaces, whether using wired or wireless access technologies, could be used to connect the terminal 120 through the MAGs. Even though elements of the PMIP network 100 are shown as directly coupled in FIG. 1, the elements may be indirectly coupled and separated geographically. The simplified coupling is shown in order to more clearly illustrate communication paths. For example, in some embodiments, access points (not shown) could provide connectivity between the terminal 120 and the MAGs. For simplicity, and without limiting the embodiment, it should be understood that the illustrated MAGs comprise access point features.

As shown on FIG. 1, the LMA contains home network prefix (HNP) information for the terminal 120. The term "HNP" is a PMIP example of a more generic subnet prefix. An internet protocol version 6 (IPv6) address, specified in RFC 2460 entitled "Internet Protocol, Version 6 (IPv6) Specification" from the IETF, generally comprises a subnet prefix, in the most significant bits, and an interface identifier (IID). While IPv6 specifies addresses of a 128-bit length, the length of the subnet prefix is variable. In the context of the present invention, the length of the prefix may be from 1 to 128 bits and, as such, the subnet prefix may constitute a part or the whole of the IPv6 address. A first HNP, labeled HNP1, is related to the MAG1 while HNP2 is related to the MAG2. When the terminal 120 gets access to the PMIP network 100, the LMA forwards the HNP1 value to the MAG1. The MAG1 uses the HNP1 value and an IID to build the home address (HoA) HoA1 for use as an address of the terminal 120. The IID may be supplied by the LMA 110 or by the MAG1. In some embodiments, a subnet prefix used as the HNP1 value may fill the entire IPv6 address length and no IID may be required. Likewise, the MAG2 assigns HoA2 to the terminal 120. Because the terminal 120 may communicate with a plurality of CNs through a same MAG, flow identities (FID) may be used to further distinguish data payload exchanged between the terminal 120 and each of the CNs.

To identify a data flow, a simple approach may comprise using a source address (SA) and a destination address (DA), combined with a flow label. These addresses and label are all present in an IPv6 header, specified in the RFC 2460. Specifically, a HoA allocated to a terminal and an address of a correspondent node having a session with the terminal provide the SA and DA, interchangeably depending on a direction of the data flow. Per the RFC 2460, a flow label of up to a 20-bit length may further distinguish data flows exchanged using the same addresses.

Figure 2:
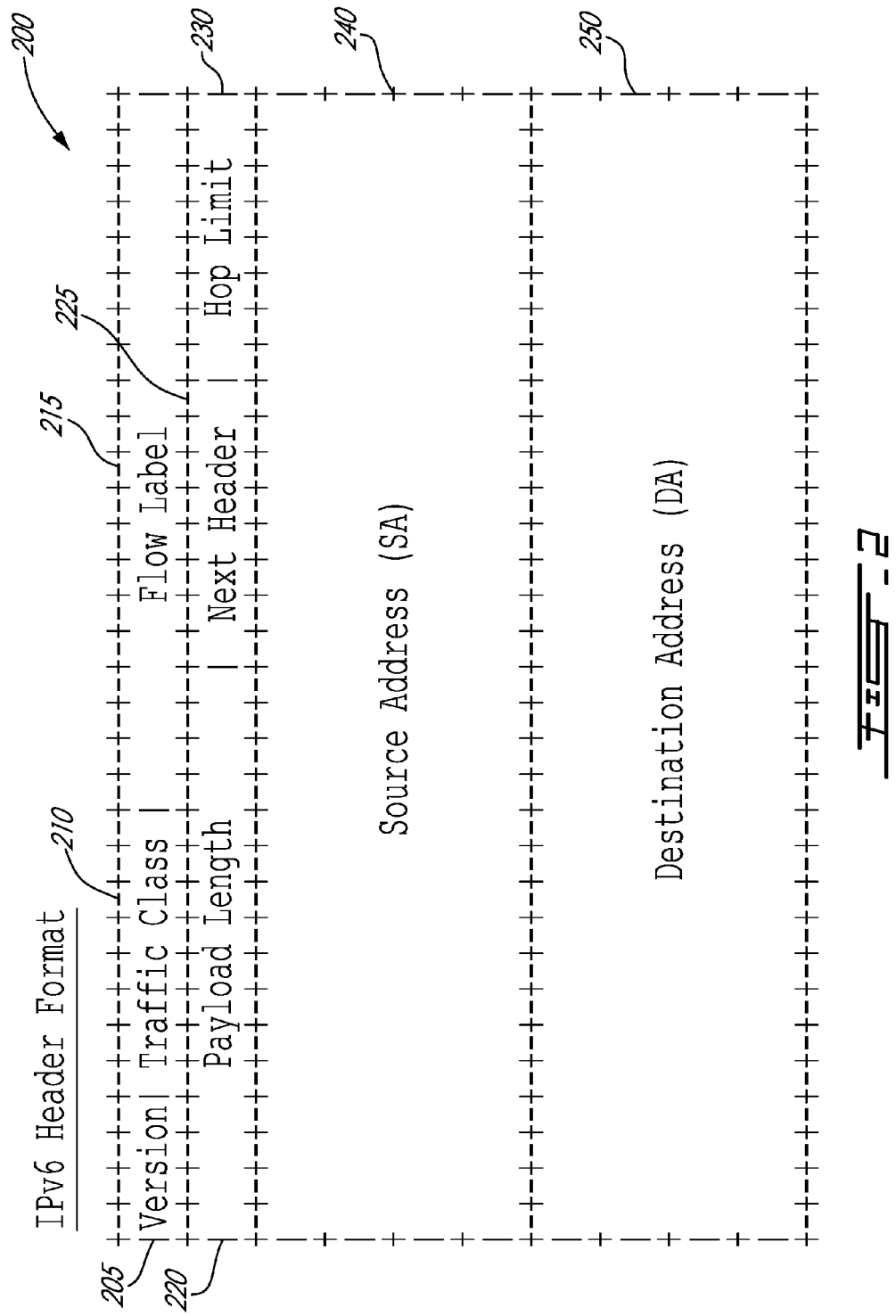
FIG. 2 shows an internet protocol version 6 header format.

FIG. 2 shows an internet protocol version 6 header format according to the IPv6 RFC 2460. The IPv6 header format 200 comprises a version 205, a traffic class 210, a flow label 215, a payload length 220, a next header indication 225, a hop limit 230, a source address (SA) 240 and a destination address (DA) 250. Those skilled in the art of IPv6 are familiar with these fields. The various FID values shown on FIG. 1 may be designed based on this format 200, using for example the flow label 215, alone or in combination with the SA 240 and with the DA 250. Other formats may also be used. In FIG. 1, FID1 is used to identify every data packet exchanged between the terminal 120 and CN1. Likewise, data packets exchanged between the terminal 120 and CN2 or CN3 are respectively identified by use of FID2 and FID3. The terminal 120 may send through the MAG1 a data packet intended for the CN3. The data packet comprises in an IPv6 header, the HoA1 that constitutes the SA and, as a DA, an address of the CN3. The data packet may further comprise the flow label, wherein a combination of the SA, DA and flow label makes the FID3. The MAG1 tunnels the data packet, according to the PMIP protocol, by adding an external SA designating the MAG1 and an external DA designating the LMA 110. The LMA 110 detunnels the data packet and forwards the original, detunneled data packet towards the original DA, which is the CN3. The FID3 is part of IPv6 header of the original data packet sent from the terminal 120, the header being preserved through the tunneling process, and is thus received by the CN3.

Figure 3:
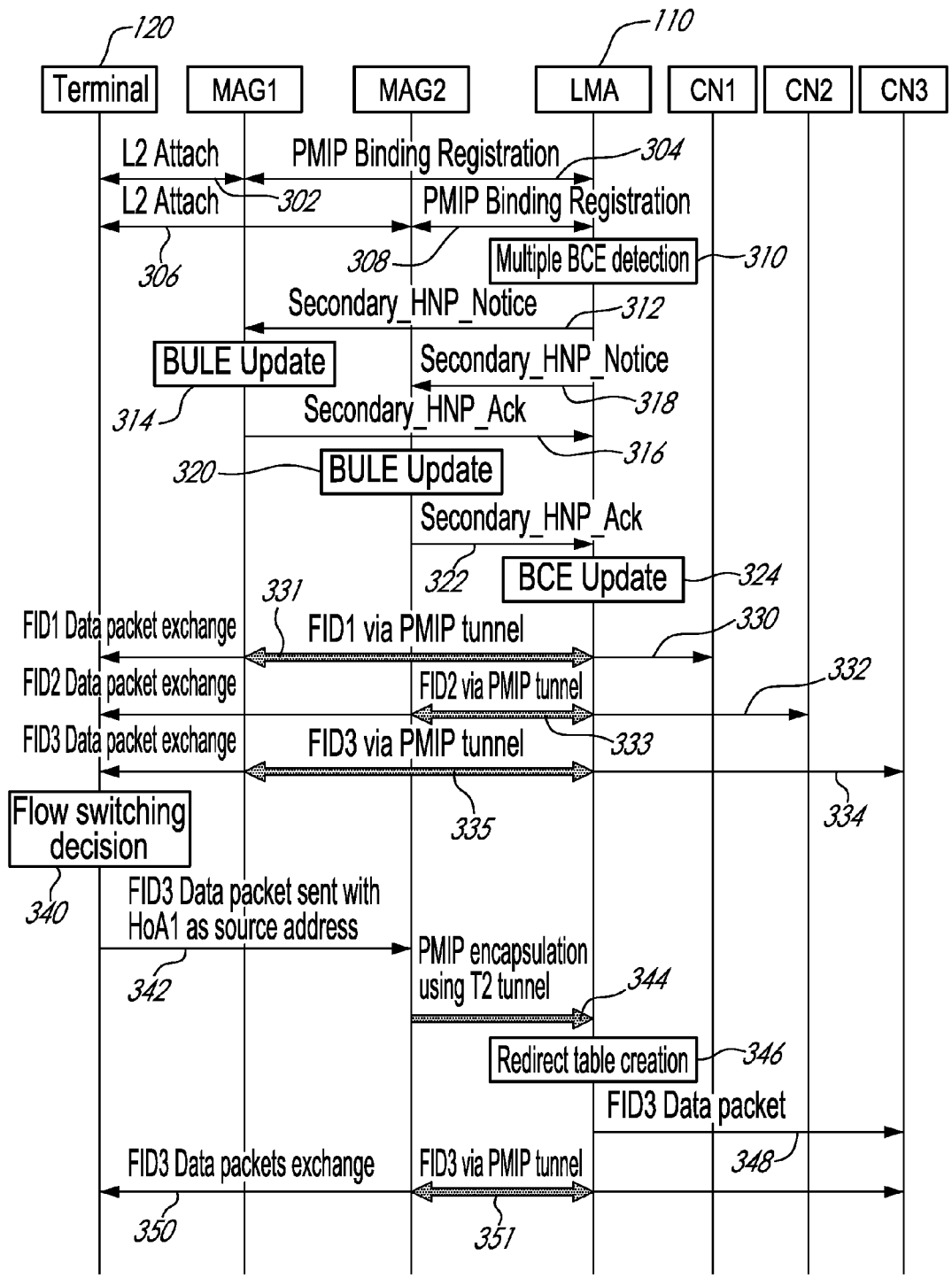
FIG. 3 shows a sequence diagram depicting exemplary steps in methods of the present invention.

FIG. 3 shows a sequence diagram depicting exemplary steps in methods of the present invention. The elements of the PMIP network of FIG. 1 are reproduced on FIG. 3. The sequence may generally be separated in a first initialization phase and a second flow switching phase.

The initialization phase starts at step 302 when the terminal 120 makes a first connection with the MAG1, by use of a layer 2 (L2) attachment, for purposes of communicating with a CN. As a result, PMIP binding registration takes place at step 304. The registration comprises the creation in the LMA 110 of a binding cache entry (BCE) for the terminal 120. The BCE comprises an identity of the terminal. The terminal identity may take any form that uniquely identifies the terminal 120, for example an international mobile station identity (IMSI), a uniform resource locator (URL), an email address, and the like. The BCE further comprises a subnet prefix such as the HNP1, and an identity of the MAG1. The identity of the MAG1 may take the form of an address of the MAG1, which is deemed a proxy care-of address (pCoA) of the terminal 120. The identity of the MAG1 may alternatively take the form of an identity of a tunnel between the LMA 110 and the MAG1, a pointer to a database of the LMA 110 linking the BCE to the MAG1, and the like. The LMA 110 may further store the FID1 in the BCE. The registration process also comprises the LMA 110 sending the HNP1 in a binding acknowledgement to the MAG1. The MAG1 advertises the HNP1, and optionally an IID, to the terminal 120 so that the terminal 120 can configure its HoA1.

At any time thereafter, the terminal 120 makes a second connection with the MAG2, at step 306. This is followed at step 308 by a second PMIP binding registration, of a same nature as the registration of step 304, leading to the creation of a second BCE for the terminal 120, the second BCE comprising the HNP2. At step 310, the LMA 110 notes that two BCEs comprise the same terminal identity and are thus stored for the same terminal 120. As a result, the LMA 110 sends, towards each MAG, information about the HNP used at the other MAG. At step 312, the LMA 110 sends a secondary HNP notice message to MAG1, the message carrying the HNP2. At step 314, the MAG1 stores the information in a binding update list (BUL). The MAG1 may respond with an acknowledgement at step 316. Likewise, the LMA 110 sends a secondary HNP notice message to MAG2, carrying the HNP1. At step 320, the MAG2 stores the HNP1 in a BUL and may then respond to the LMA at step 322. At step 324, the LMA 110 may update both BCEs for the terminal 120 by taking note that data flows may be switched or redirected between the MAG1 and the MAG2, based on having the same terminal identity stored in both BCEs. One exemplary manner of taking this note may consist of storing alternate MAG identities in the BCEs, wherein the first BCE designates MAG2 as an alternate MAG and wherein the second BCE designates MAG1 as an alternate MAG. Step 324 may take place at any time after step 310, and does not depend on the acknowledgements of steps 316 and 322.

Table 1 shows an exemplary binding cache stored in the LMA 110 of FIG. 3. The table shows 3 entries. The first two rows represent results of the steps 302-324 and the third row represents a result of a similar process (not shown) for a distinct data flow. Some fields of the BCEs are optional and may not be present in some embodiments. The shown binding cache comprises three BCEs. An index is used as an internal reference within the table; the index values are unique within the LMA 110. An identity (ID) of the terminal is identical in the 3 entries because all entries are for the same terminal. A primary pCoA may be found in each entry; these primary pCoAs represent addresses of MAG1 and MAG2 to which the terminal 120 is connected. An identity may be allocated to tunnels T1 and T2 present between the LMA 110 and the MAG1 and MAG2, respectively. Either one of the primary pCoA or tunnel identities may exemplary be used as MAG identities, in the context of the present invention. Redirection indicators (shown as redirect bits in table 1) are reset, set to zero, or set to null values, during the initialization phase. In some embodiments, a FID received from the terminal 120 at the time of binding registration may be stored in the BCE. The third row of table 1 differs from the first row only by a distinct FID value. The terminal 120 has indicated that it intends to communicate by use of two distinct data flows, for example towards two distinct CNs, through the same MAG1. In other embodiments, the FID value is not present in the BCE table. In such cases, only one BCE is stored in the LMA for the terminal 120 on the MAG1 and the redirection indicators are used when there is a need to indicate that redirection applies for any one of the data flows related to that BCE. Further information about which data flow or flows are redirected may then be stored in a redirection table, which is described hereinbelow. The above mentioned entries of the table 1 are added as each BCE entry is created, at steps 304 and 308. As exemplified in table 1, alternate MAG identities, illustrated in the form of alternate pCoAs, may be stored at step 324, indicating that data flows may be switched or redirected between the MAG1 and the MAG2.

TABLE 1

| BCE index | ID | Primary HNP | Primary pCoA | FID | Tunnel ID | Alternate pCoA | Redirect bit |
|---|---|---|---|---|---|---|---|
| 1 | Terminal 120 | HNP1 | MAG1 address | FID1 | T1 | MAG2 address | 0 |
| 2 | Terminal 120 | HNP2 | MAG2 address | FID2 | T2 | MAG1 address | 0 |
| 3 | Terminal 120 | HNP1 | MAG1 address | FID3 | T1 | MAG2 address | 0 |

Table 1 as presented only shows BCEs for a single terminal and, in this example, only three BCEs exist for the terminal 120. In practice, the binding cache of the LMA 110 could comprise one, two or a plurality of entries for the same terminal and would also comprise a multiplicity of entries for a variety of terminals. Likewise, address of various MAGs could be present in the binding cache. Table 1 is thus much simplified for ease of illustration of the present embodiment.

Table 2 shows an exemplary BUL stored in the MAG1 of FIG. 3. The contents of table 2 are stored in MAG1 during the PMIP binding registration process of step 304, except for the secondary HNP which is stored at step 314. An index is used as an internal reference within the table; the index values are unique within the MAG1. Of course, a similar BUL is stored in MAG2, at steps 308 and 320. The HoA1 and HoA2 values are not shown in the BUL entry (BULE), but it should be understood that there are direct relations, between HNP1 and HoA1 on one hand, and between HNP2 and HoA2 on the other hand. Table 2 comprises a row created at step 304 and completed at step 314.

TABLE 2

| BULE index | ID | Primary HNP | LMA address | Secondary HNPs |
|---|---|---|---|---|
| 1 | Terminal 120 | HNP1 | LMA address | HNP2 |

As mentioned above in regards to table 1, table 2 is simplified for ease of illustration. The BUL of MAG1 could comprise more than one entry, each having a distinct secondary HNP, for the same terminal 120. Of course, the BUL of MAG1 could comprise many entries for different terminals.

Returning to FIG. 3, at the end of the initialization phase, data is exchanged between the terminal 120 and the correspondent nodes. There are data flows between the terminal 120 and correspondent nodes CN1, CN2 and CN3, generally shown at steps 330, 332 and 334, respectively. Data flows exchanged between the terminal 120 and the various CNs is identified by the distinct FID values shown. In a PMIP embodiment, data packets are encapsulated in tunnels between the MAGs and the LMA, at steps 331, 333 and 335 respectively. Data sent from the terminal carries as a source address an address of the terminal 120, equal to the HoA1, if sent through the MAG1, or to the HoA2, if sent through the MAG2. That data carries addresses of the relevant CN as destination addresses. In the opposite direction, from the CNs towards the terminal 120, the SA and DA exchange their positions. The complete IPv6 headers originated from the terminal 120 or from the CNs, comprising the SA, DA and flow label, are preserved in the tunneling process. As such, the FID values remain available for distinguishing the data flows.

Continuing with the description of FIG. 3, the flow switching phase of the method of the present embodiment will now be described. At step 340, based for example on quality of service (QoS) constraints, the terminal 120 elects to switch a data flow FID3 from MAG1 to MAG2, with the intent to continue the session present on that data flow. At step 342, the terminal 120 sends a data packet carrying the HoA1 as a source address, also carrying the FID3 value, through interface IF2 (shown on FIG. 1), towards the MAG2. Without the benefit of the present invention, ingress filtering in the MAG2 could reject this packet because the HoA1 does not correspond to any address earlier advertised by the MAG2. According to the present embodiment, because the HoA1 corresponds to the HNP1 stored as a secondary HNP in the BUL of MAG2, the packet received at step 342 is accepted by the MAG2. At step 344, the packet is forwarded to the LMA 110 within tunnel ID T2, which is the same tunnel ID that would be used for a packet received at the MAG2 with HoA2.

At step 346, the LMA 110 detects that the data packet has been received from MAG2, via tunnel T2, but carrying HoA1 as a source address. The data packet may further comprise the FID3. The HoA1 maps on the BCE shown on the first row of table 1, which comprises the HNP1. In order to verify that the data packet of step 346 comes from a legitimate MAG, the LMA 110 may verify that this BCE, which identifies the terminal 120, further associates the terminal 120 with the MAG2. This can be made by verifying that the BCE comprises the identity of the MAG2, for example in the form of the alternate pCoA. In case where the data packet of step 346 is received from another MAG (not shown), which has not been identified at step 324 as supporting flow redirection for the terminal 120, the data packet may optionally be discarded by the LMA 110. The LMA 110 needs to set redirection information for the terminal 120. For this purpose, the LMA 110 may set the redirect bit values to 1 in one or more of the BCEs entry having HNP1 as a primary HNP. In some embodiments, the redirect bit value is set to 1 in any BCE comprising the HNP1. In other embodiments, based on the FID3 included in the received data packet, the redirect bit is only set in the BCE illustrated on the bottom row of Table 1. In yet another embodiment wherein only one BCE is stored for any data flow of the terminal 120, the redirect bit may be set as soon as at least one data flow is being redirected, and the FID may be identified in the redirection table, which is illustrated in table 3. Still at step 346, the LMA 110 may create an entry in the redirection table. The entry comprises an index, for internal reference within the LMA 110, the identity of the terminal 120, the primary HNP, which is HNP1, and a new destination for the data flow having been transferred. The new flow destination itself may comprise the FID that is being transferred, or no FID if all data flows related to the HNP1 are redirected, the pCoA that applies to the redirected data flows, wherein the pCoA is the address of the MAG2, and the tunnel ID for carrying the redirected data flows. The redirect table may comprise several entries, each identified by a distinct index, for various terminals. Moreover, for each terminal, the redirect table may comprise one or more new flow destinations, as the terminal may support a plurality of data flows, each of which may be redirected through distinct MAGs.

TABLE 3

| Redirect Table index | ID | Primary HNP | New flow destination | | |
|---|---|---|---|---|---|
| | | | Flow Identifier | New pCoA | New Tunnel ID |
| 1 | Terminal 120 | HNP1 | FID3 ... | MAG2 address ... | T2 ... |

In some embodiments of the present invention, the redirection table may not be present. Instead, redirection information may be stored directly in the BCE of Table 1. The redirection information may comprise, for example, a MAG identity or the pCoA for the MAG that is used to carry the data flow after step 342, the redirection information possibly storing this MAG information in relation with the redirect bit or with similar information. The redirection information may instead comprise the tunnel ID used to carry the data flow after step 342.

At step 350, data according to FID3 continues being exchanged between the terminal 120 and the CN3, now being tunneled between the MAG2 and the LMA 110 at step 351. The address used to identify the terminal 120 as source or destination addresses, depending on a direction of the data, is the HoA1. Because that value corresponds to HNP1, which is a secondary HNP in the BUL of the MAG2, data is communicated towards the terminal 120 or towards the LMA 110, without filtering by the MAG2. At the LMA 110, a data packet may be received from the CN3, carrying the HoA1 as a destination address and carrying the FID3. The LMA 110 notes that the BCE entry for HNP1, which corresponds to HoA1, has the redirect bit set to 1. It looks in the redirection table and locates the entry having HNP1. It matches the flow identifier with FID3 and thereby knows that the data packet is to be forwarded towards MAG2, using tunnel T2. Because MAG2 has in its BUL entry the value HNP1 as a secondary HNP, it accepts the data packet and forwards it towards the terminal 120.

As other data arrives at the LMA 110 from the CN1, carrying the HoA1 as a destination address and carrying the FID1, the LMA 110 observes in the corresponding BCE entry that no redirection is specified. The LMA 110 forwards the other data towards the terminal 120 by use of the tunnel T1, through the MAG1.

In some embodiments, at step 340, the terminal 120 may desire to switch all of its data flows using HoA1 towards the MAG2. This may be achieved simply by omitting the flow identifier in the data packet sent towards MAG2 at step 342. Alternatively, a generic value designating "all data flows" could be used as a flow identifier, for the same purpose. In other embodiments, a policy in the LMA 110 may force all data flows related to a same HoA to be transferred at once. In either cases, the flow identifier within the redirect table shown in table 3 could be left empty or replaced by a generic value stipulating that all data flows related to the primary HNP are to be redirected.

Figure 4:
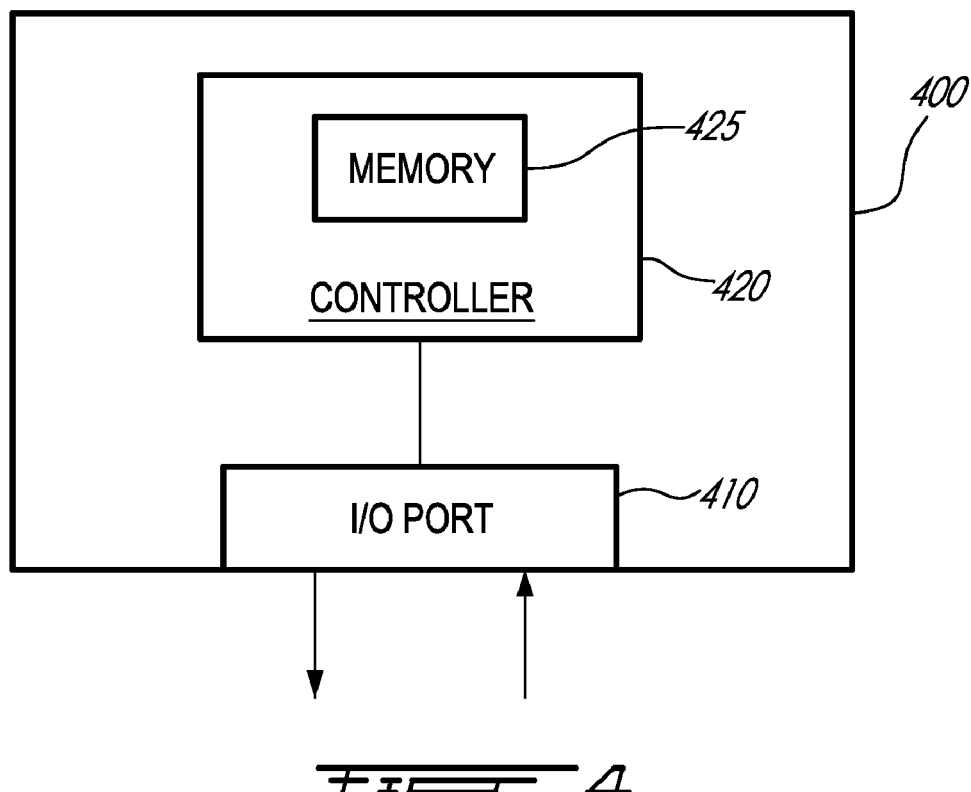
FIG. 4 shows an exemplary anchor node according to an embodiment of the present invention.

An exemplary construction of an anchor node will now be described by reference to FIG. 4, which shows an exemplary anchor node according to an embodiment of the present invention. The anchor node 400 comprises an input/output (I/O) port 410 and a controller 420. The controller 420 may comprise any commercially available, general purpose processor, or may be specifically designed for operation in the anchor node 400. The controller 420 may be operable to execute processes related to the present invention in addition to numerous other processes. The controller 420 may further comprise a memory 425. The memory 425 may be a volatile memory, or may alternatively be a non-volatile memory, or persistent memory, that can be electrically erased and reprogrammed and that may be implemented, for example, as a flash memory or as a data storage module. The I/O port 410 may be implemented as one single device or as distinct devices for receiving and sending signaling, messages and data. The anchor node 400 is connected towards one or more gateway and, through the Internet, to a plurality of correspondent nodes (CN), and the like; means for connecting the anchor node 400 towards other nodes may vary as, for example, connection towards one gateway might be on an Ethernet link while connection towards a CN might be on an asynchronous transfer mode (ATM) link. Therefore the I/O port 410 may comprise a plurality of devices for connecting on a plurality of links of different types. Only one generic I/O port 410 is illustrated for ease of presentation of the present invention. The anchor node 400 may further act as a router and may thus comprise many more components, as is well-known in the art. The anchor node 400 of the present invention may comprise a LMA operating as per the PMIP protocol and, as such, the controller 420 may be capable of encapsulating and decapsulating data packets for tunneling between the anchor node and a PMIP gateway.

The anchor node 400 of the present invention is used for supporting a terminal that desires to continue on a second gateway a session established at a first gateway. The controller 420 controls the I/O port 410. Signals and messages arriving at the I/O port 410 are forwarded to the controller 420 for analysis. When the controller 420 needs to send a signal or message, it generates the signal or message and instructs the I/O port 410 to put it on a link towards its destination.

The controller 420 may store in the memory 425 binding cache entries (BCE) for the terminal. Each BCE comprises a terminal identity, which is the same identity in all BCEs for the terminal. Each BCE also comprises a distinct subnet prefix, which may be a HNP, and an identity of a gateway providing access to the terminal by use of the distinct subnet prefix. The controller 420 detects that more than one BCE is stored for the same terminal and requests the I/O port 410 to send towards the gateways HNPs related to the other gateways. Also upon detection, the controller 420 may store alternate gateway information in the BCEs, wherein the alternate gateway information in one of the BCEs designates the other gateway or gateways providing access to the same terminal. The BCEs may be stored in the format of table 1. Contents of the exemplary table 1 could be implemented in the memory 425 in various forms. It is not required to store the contents in the anchor node 400 in the form of a table. In alternate embodiments, the contents could take the form of a relational database, or any like means of storing information.

The controller 420 may receive data from the second gateway, carrying the second gateway identity and a terminal address as a source address. The controller 420 locates one of the BCEs comprising a HNP value that maps on the terminal address. In some cases, the located BCE associates the received HNP value with the first gateway, so the controller 420 detects a mismatch between the first gateway of the located BCE and the second gateway from which the data is received. The mismatch is indicative of a decision made by the terminal to switch a data flow from the first gateway to the second gateway. Having detected a mismatch, the controller 420 may optionally verify that the located BCE comprises an alternate gateway identity designating the second gateway. In case of a positive verification (or in any case if that step is omitted), the controller 420 stores redirection information in the located BCE. The redirection information is indicative that data received from a correspondent node, addressed to the terminal by use of the HNP that originally maps to the first gateway, shall now be redirected towards the second gateway. Optionally, the BCEs may also store FID values. If so, and if the data received from the second gateway carrying the HNP that does not match the second gateway also carries a FID value, redirection information may optionally be stored only in a BCE that comprises the received FID value.

The controller 420 may receive from a third gateway data carrying the HNP value that maps on the first gateway. If the controller 420 detects that the located BCE does not associate the third gateway with the terminal, the controller 420 may discard the data received from the third gateway.

Figure 5:
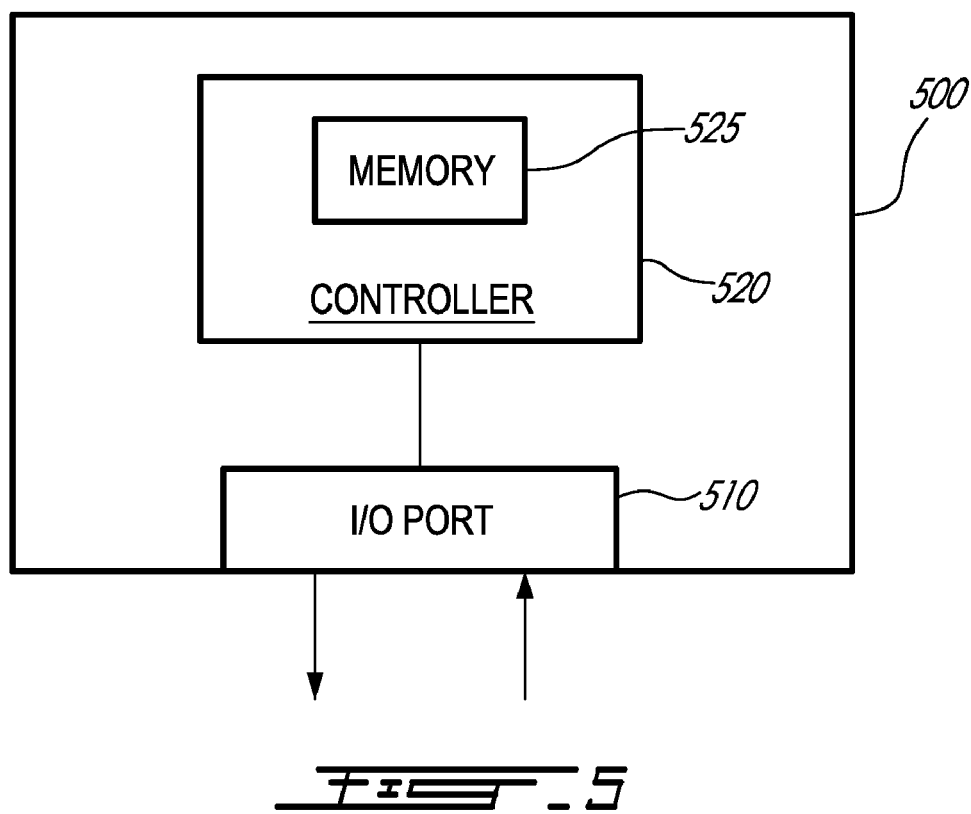
FIG. 5 shows an exemplary gateway according to an embodiment of the present invention.

FIG. 5 shows an exemplary gateway according to an embodiment of the present invention. The gateway 500 comprises an input/output (I/O) port 510 and a controller 520. The controller 520 may comprise any commercially available, general purpose processor, or may be specifically designed for operation in the gateway 500. The controller 520 may be operable to execute processes related to the present invention in addition to numerous other processes. The controller 520 may further comprise a memory 525. The memory 525 may be a volatile memory, or may alternatively be a non-volatile memory, or persistent memory, that can be electrically erased and reprogrammed and that may be implemented, for example, as a flash memory or as a data storage module. The I/O port 510 may be implemented as one single device or as distinct devices for receiving and sending signaling, messages and data. The gateway 500 is connected towards one or more anchor node and to a plurality of terminals; means for connecting the gateway 500 towards other nodes may vary as, for example, connection towards one anchor might be on an Ethernet link while connection towards a terminal might be on a wireless link. The I/O port 510 may communicate with terminals either directly or through access points. Therefore the I/O port 510 may comprise a plurality of devices for connecting on a plurality of links of different types. Only one generic I/O port 510 is illustrated for ease of presentation of the present invention. The gateway 500 may further act as a router and may thus comprise many more components, as is well-known in the art. The gateway 500 of the present invention may comprise a MAG operating as per the PMIP protocol and, as such, the controller 520 may be capable of encapsulating and decapsulating data packets for tunneling between the gateway 500 and a PMIP anchor node.

The gateway 500 of the present invention is used for supporting a terminal that desires to continue a session established at a peer gateway. The controller 520 controls the I/O port 510. Signals and messages arriving at the I/O port 510 are forwarded to the controller 520 for analysis. When the controller 520 needs to send a signal or message, it generates the signal or message and instructs the I/O port 510 to put it on a link towards its destination.

The controller 520 initiates sending to the anchor node binding update (BU) information for the terminal, comprising an address of the gateway 500 and a terminal identity. The controller 520 in turn receives from the anchor a first HNP, for use as a first subnet prefix for the terminal. The controller 520 stores the first HNP in the memory 525, in a binding update list (BUL) for the terminal. The BUL entry may further comprise an identity of the terminal. The controller 520 also receives from the anchor a second HNP, for use as a secondary subnet prefix for the terminal. The controller updates the BUL entry by adding the second HNP in relation with the first HNP. The BUL may be stored in the format of table 2. Contents of the exemplary table 2 could be implemented in the memory 525 in various forms. It is not required to store the contents in the gateway 500 in the form of a table. In alternate embodiments, the contents could take the form of a relational database, or any like means of storing information.

The controller 520 may receive data from the terminal, the data carrying the second HNP. The controller 520 may optionally verify that the second HNP is present in the BUL entry for the terminal and, if that verification fails, decide to discard the data. In case of a positive verification (or in any case if that step is omitted), the controller 520 may request the I/O port 510 to forward the data, which carries the second HNP, to the anchor node. The controller 520 may further receive from the anchor further data carrying the second HNP, in which case the controller 520 requests the I/O port 510 to forward the further data towards the terminal. If the data or the further data comprises a flow identity (FID), the FID is forwarded towards the anchor node or towards the terminal.

Although several embodiments of the methods, of the anchor node and of the gateway of the present invention have been illustrated in the accompanying Drawings and described in the foregoing Detailed Description, it will be understood that the invention is not limited to the embodiments disclosed, but is capable of numerous rearrangements, modifications and substitutions without departing from the teachings of the invention as set forth and defined by the following claims.

The invention claimed is:

1. A method of supporting session continuity for a terminal served by a first gateway and a second gateway, the method comprising:
   storing a first binding cache entry (BCE) comprising a first terminal identity, a first subnet prefix and a first gateway identity;
   storing a second BCE comprising a second terminal identity, a second subnet prefix and a second gateway identity;
   determining that the first and second terminal identities are for a same terminal;
   responsive to determining that the first and second terminal identities are for the same terminal, sending the second subnet prefix towards the first gateway and sending the first subnet prefix towards the second gateway;
   receiving data from the second gateway, the data carrying the second gateway identity and a terminal address comprising the first subnet prefix;
   based on the terminal address, reading the first BCE;
   determining a mismatch between the received second gateway identity and the first gateway identity stored in the first BCE; and
   responsive to determining the mismatch, storing redirection information in the first BCE.

2. The method of claim 1, further comprising:
   responsive to detecting that the first and second terminal identities are for the same terminal, storing the second gateway identity as an alternate gateway identity in the first BCE.

3. The method of claim 2, wherein:
   storing the redirection information is conditional to verifying that the second gateway identity is stored in the first BCE.

4. The method of claim 1, further comprising:
   receiving from an external correspondent further data intended for the terminal address; and
   based on the redirection information, forwarding the further data towards the second gateway.

5. The method of claim 1, wherein:
   the redirection information comprises the second gateway identity.

6. The method of claim 1, wherein:
   the data received from the second gateway, carrying the second gateway identity and the terminal address that comprises the first prefix, further comprises a first flow indicator (FID); and
   the redirection information is stored in association with the first FID.

7. The method of claim 6, further comprising:
   receiving from an external correspondent further data intended for the terminal address, wherein the further data carries one of the first FID and a second FID; and
   conditionally redirecting the further data towards the second gateway if it carries the first FID.

8. The method of claim 1, wherein:
   the first and second gateways are media access gateways;
   the first and second BCEs are stored in a local mobility anchor; and
   the local mobility anchor communicates with the first and second gateways by use of a proxy mobile internet protocol.

9. A method of supporting session continuity for a terminal served by a first gateway and a second gateway, the method comprising:
   storing a first binding cache entry (BCE) comprising a first terminal identity, a first subnet prefix and a first gateway identity;
   storing a second BCE comprising a second terminal identity, a second subnet prefix and a second gateway identity;
   detecting that the first and second terminal identities are for a same terminal;
   responsive to detecting that the first and second terminal identities are for the same terminal, sending the second subnet prefix towards the first gateway and sending the first subnet prefix towards the second gateway; and
   responsive to the step of detecting, storing in the first and second BCEs indications that flow switching is supported between the first and second gateways;
   receiving data from a third gateway, the data carrying a third gateway identity and a terminal address comprising the first subnet prefix;
   based on the terminal address, reading the first BCE;
   detecting a mismatch between the received third gateway identity and the first gateway identity stored in the first BCE;
   detecting that flow switching is only supported between the first and second gateways; and
   discarding the data received from the third gateway.

10. An anchor node for supporting session continuity for a terminal served by a first gateway and a second gateway, comprising:
    an input/output (I/O) port configured to communicate with the first and second gateways; and
    a controller to control the I/O port and configured to:
       store in a memory a first binding cache entry (BCE) comprising a first terminal identity, a first subnet prefix and a first gateway identity,
       store in the memory a second BCE comprising a second terminal identity, a second subnet prefix and a second gateway identity, and
       determine that the first and second terminal identities are for a same terminal;
    wherein, responsive to determining that the first and second terminal identities are for the same terminal, the controller is further configured to:
       request the I/O port to send the second subnet prefix towards the first gateway and to send the first subnet prefix towards the second gateway
    and wherein said controller is further configured to:
       receive data from the second gateway, the data carrying the second gateway identity and a terminal address comprising the first subnet prefix,
       based on the terminal address, read the first BCE,
       detect a mismatch between the received second gateway identity and the first gateway identity stored in the first BCE, and
       responsive to detecting the mismatch, store redirection information in the first BCE.

11. The anchor node of claim 10, wherein:
the controller is further configured to:
  responsive to detecting that the first and second terminal identities are for the same terminal, store the second gateway identity as an alternate gateway identity in the first BCE.

12. The anchor node of claim 11, wherein:
the controller is further configured to:
  before storing the redirection information, verify that the second gateway identity is stored in the first BCE.

13. The anchor node of claim 10, wherein:
the I/O port is further configured to communicate with an external correspondent; and
the controller is further configured to:
  receive from the external correspondent further data intended for the terminal address, and
  based on the redirection information, request the I/O port to forward the further data towards the second gateway.

14. The anchor node of claim 13, wherein:
the redirection information comprises the second gateway identity.

15. The anchor node of claim 10, wherein:
the data received from the second gateway, carrying the second gateway identity and the terminal address that comprises the first prefix, further comprises a first flow indicator (FID); and
the controller is further configured to store the redirection information in association with the first FID.

16. The anchor node of claim 15, wherein:
the I/O port is further configured to communicate with an external correspondent; and
the controller is further configured to:
  receive from the external correspondent further data intended for the terminal address, wherein the further data carries one of the first FID and a second FID, and
  conditionally redirect the further data towards the second gateway if it carries the first FID.

17. The anchor node of claim 10, wherein:
the anchor node is a local mobility anchor; and
communication is made with the first and second gateways by use of a proxy mobile internet protocol.

18. An anchor node for supporting session continuity for a terminal served by a first gateway and a second gateway, comprising:
  an input/output (I/O) port configured to communicate with the first and second gateways; and
  a controller to control the I/O port and configured to:
    store in a memory a first binding cache entry (BCE) comprising a first terminal identity, a first subnet prefix and a first gateway identity,
    store in the memory a second BCE comprising a second terminal identity, a second subnet prefix and a second gateway identity, and
    detect that the first and second terminal identities are for a same terminal;
  wherein, responsive to detecting that the first and second terminal identities are for the same terminal, the controller is further configured to:
  request the I/O port to send the second subnet prefix towards the first gateway and to send the first subnet prefix towards the second gateway;
  and wherein:
  the controller is further configured to, responsive to the detection that the first and second terminal identities are for the same terminal, store in the first and second BCEs indications that flow switching is supported between the first and second gateways;
  the I/O port is further configured to communicate with a third gateway; and the controller is further configured to:
  receive data from the third gateway, the data carrying a third gateway identity and a terminal address comprising the first subnet prefix,
  based on the terminal address, read the first BCE,
  detect a mismatch between the received third gateway identity and the first gateway identity stored in the first BCE,
  detect that flow switching is only supported between the first and second gateways, and
  discard the data received from the third gateway.

* * * * *